United States Patent [19]
Heikkila et al.

[11] Patent Number: 5,557,639
[45] Date of Patent: Sep. 17, 1996

[54] ENHANCED DECODER FOR A RADIO TELEPHONE

[75] Inventors: Ilkka Heikkila, Märynummi; Harri Jokinen, Hiisi; Jukka Ranta, Salo, all of Finland

[73] Assignee: Nokia Mobile Phones Ltd., Salo, Finland

[21] Appl. No.: 322,445

[22] Filed: Oct. 5, 1994

[30] Foreign Application Priority Data

Oct. 11, 1993 [FI] Finland ..................... 934480

[51] Int. Cl.$^6$ ..................... H04B 13/02; H04B 17/00
[52] U.S. Cl. ............... 375/224; 455/226.1; 455/226.3; 375/227; 375/346; 371/44
[58] Field of Search ..................... 375/224, 225, 375/227, 359, 285, 346, 348; 455/226.1, 226.2, 226.3, 63, 67.3, 226.1, 226.2, 226.3; 371/43, 44, 45

[56] References Cited

U.S. PATENT DOCUMENTS

| | | | |
|---|---|---|---|
| 4,675,871 | 6/1987 | Gordon et al. | 371/46 |
| 4,991,184 | 2/1991 | Hashimoto | 375/8 |
| 5,214,687 | 5/1993 | Kansakoski et al. | 379/60 |
| 5,327,519 | 7/1994 | Haggvist et al. | 395/2.28 |
| 5,375,129 | 12/1994 | Cooper | 371/43 |
| 5,384,782 | 1/1995 | Elms | 371/2.1 |
| 5,396,653 | 3/1995 | Kivari et al. | 455/88 |
| 5,420,889 | 5/1995 | Juntti | 375/346 |
| 5,432,884 | 7/1995 | Kapanen et al. | 395/2.37 |

FOREIGN PATENT DOCUMENTS

| | | |
|---|---|---|
| 0323606 | 7/1989 | European Pat. Off. . |
| 0397968 | 11/1990 | European Pat. Off. . |
| 0428199 | 5/1991 | European Pat. Off. . |
| 0472175A2 | 2/1992 | European Pat. Off. . |
| 470372 | 12/1993 | Sweden . |
| WO92/22162 | 12/1992 | WIPO . |

OTHER PUBLICATIONS

Finnish Office Action and Translation thereof dated 10 Jun. 1994 Nokia Mobile Phones Ltd.
N. Jayant/P. Noll, "Digital Coding of Waveforms", 1984, Prentice–Hall, NJ, U.S. pp. 194, 651–652.
Drogo de Iacovo et al, "CELP Coding at 6.55 KBIT/S for Digital Mobile Radio Communications" Globecom '90:IEEE Global Telecommunications Conf. pp. 0538–0541.
Goni, U.S. et al, "Performance of a DS CDMA System in Multipath Fading Mobile Radio Environment with Multiple Access Interference." IEE Colloq. (1993) No. 095 Spread Spectrum Techniques for Mobile Radio. pp. 13/1–13/6.
G. David Forney, Jr., "Maximun–Likelihood Sequence Estimation of Digital Sequences in the Presence of Intersymbol Interference" IEEE Transactions on Finformation Theory, vol. IT-18, No. 3, May 1972 pp. 363–378.
J. G. Proakis, "Digital Communications" (Second Edition).
G. Clark, Jr. et al. Error–Correction Coding for Digital Communications, 1981, pp. 381–391.
M. Vedat Eyuboglu et al. "Reduced–State Sequence Estimation for Coded Modulation on Intersymbol Interference Channels", 1989, 89–95.
T. Kamitake et al. IEEE/IEICE Global Telecommunications Conference 1987, Conference Record vol. 1 of 3, Nov. 15–18, Tokyo, Japan 4 pages.

Primary Examiner—Young T. Tse
Assistant Examiner—Bryan E. Weber
Attorney, Agent, or Firm—Perman & Green

[57] ABSTRACT

The invention provides an improved method and apparatus for identifying a bad GSM speech frame. Both the estimated signal-to-noise ratio (ESNR) of the received signal and the pseudo bit error rate (PBER) of a recorded speech signal are used to determine whether or not a speech frame is bad.

9 Claims, 2 Drawing Sheets

ENHANCED DECODER FOR A RADIO TELEPHONE

BACKGROUND OF THE INVENTION

The invention relates to digital data transmission techniques and its application in digital mobile phone systems.

Bit errors occur in the speech blocks of digital data transmission and it is not possible to correctly decode all the blocks at the receiving end. Therefore, some method must be used to remove faulty speech frames in order to avoid the disturbing sounds in earphones or speakers that are caused by the faulty frames.

GSM speech channels (GSM, Group Special Mobile) use three parity bits in each speech frame for detecting errors in data transmission. However, this is not sufficient. In addition to the parity check another method for estimating the quality of the received signal should be used. If the estimated quality of the signal is poor, the speech frame is removed even though the parity was correct. It should be remembered that the parity can be correct even though the only air interface signal received is noise.

There are two quality measures that are used in respective methods for estimating the quality of the received signal ie the estimation of the signal-to-noise ratio, and the estimation of the bit error rate of a decoded channel. The respective quality measures for these methods are the Estimated Signal-to-Noise Ratio (ESNR) and the Pseudo Bit Error Rate (PBER).

When using the method using the signal-to-noise ratio, a poor-quality speech frame is detected by giving the ESNR a certain threshold value. In this case all frames with an ESNR lower than the threshold value are removed.

When using the bit error rate method, the decoded speech frame is recorded and the coded bits are compared with the received bits. The PBER which is an estimate of the real bit error rate is obtained in this way. A certain threshold value can also be placed on the number of bit errors, whereby all the frames with a higher number of bit errors are removed.

Neither of the above-mentioned known methods is completely reliable. When using threshold values, some good frames are removed in both methods and some poor frames remain untouched.

SUMMARY OF THE INVENTION

In accordance with a first aspect of the present invention there is provided a decoder for a radio telephone, for providing a decoded signal from a signal transmitted in respective groups comprising: means for providing first and second quality measures for estimating the quality of each of the transmitted signal groups received; and means responsive to the first and second quality measures for disregarding signal groups failing to meet a chosen quality threshold.

In accordance with a second aspect of the invention there is provided a method for identifying a faulty signal group transmitted in a digital radio telephone system comprising: determining a first quality measure indicative of the quality of the signal group; determining a second quality measure indicative of the quality of the signal group; and disregarding a faulty signal group is faulty based on the first and second quality measures.

In accordance with a third aspect of the invention there is provided a method for identifying a bad GSM speech frame in digital mobile phone systems, characterized in that the estimation of the quality of the received signal is carried out using estimated signal-to-noise ratio ESNR so that the ESNR is a vector comprising the estimated signal-to-noise ratio of each received burst or a scalar describing their approximate signal-to-noise ratio, and pseudo bit error rate PBER of the received and recorded speech frame, the ESNR and PBER being functionally related to a chosen threshold and a speech frame is removed if it fails to meet the threshold.

By using two quality measures in determining whether a speech frame should be decoded, the quality of the decoded signal can be improved. The quality measures provide different error information on the signal. Suitable examples are the Estimated Signal-to Noise Ratio (ESNR) and the pseudo-bit error rate (PBER). The ESNR can be a scalar or vector comprising the estimated signal-to-noise ratio of each received burst.

The two quality measures are functionally related such that a measured variable is compared with a threshold value in order to determine if a speech frame is to be decoded. They are unconnected so they each provide a different estimate of the quality of the signal.

The quality measures may be linearly combined and compared with a fixed threshold value. One quality measure may be a vector comprising the estimated signal-to-noise ratio of each received burst, or a scalar describing its approximate signal-to-noise ratio. The other quality measure may be a pseudo-bit error rate PBER of the received and recorded speech frame is also used so that the speech frame is removed if the function of variables ESNR and PBER Pseudo Bit Error Rate is greater than a given threshold T.

As another option, however, an adaptive threshold determined in accordance with one or both of the quality measures is compared with a function of the other or both of the quality measures. The one quality measure may be the signal-to-noise ratio variance determined from the ESNR, and the other quality measure may be the PBER or vice versa.

Thus the method according to the invention is implemented with the aid of an estimate of the signal-to-noise ratio of the received signal and with the estimated bit error rate BER of the decoded speech signal.

In embodiments of the invention both the estimated signal-to-noise ratio ESNR and bit error coefficient PBER of the received and decoded speech frame are used as the basis for estimating the quality of the received signal, however, in a different way than in the previously disclosed, known methods.

BRIEF DESCRIPTION OF THE DRAWING

The invention will now be described in greater detail with reference to FIG. 1 of the accompanying drawings which is a schematic representation of a speech decoder in accordance with the invention; and wherein.

DETAILED DESCRIPTION OF THE INVENTION

Figure 1:
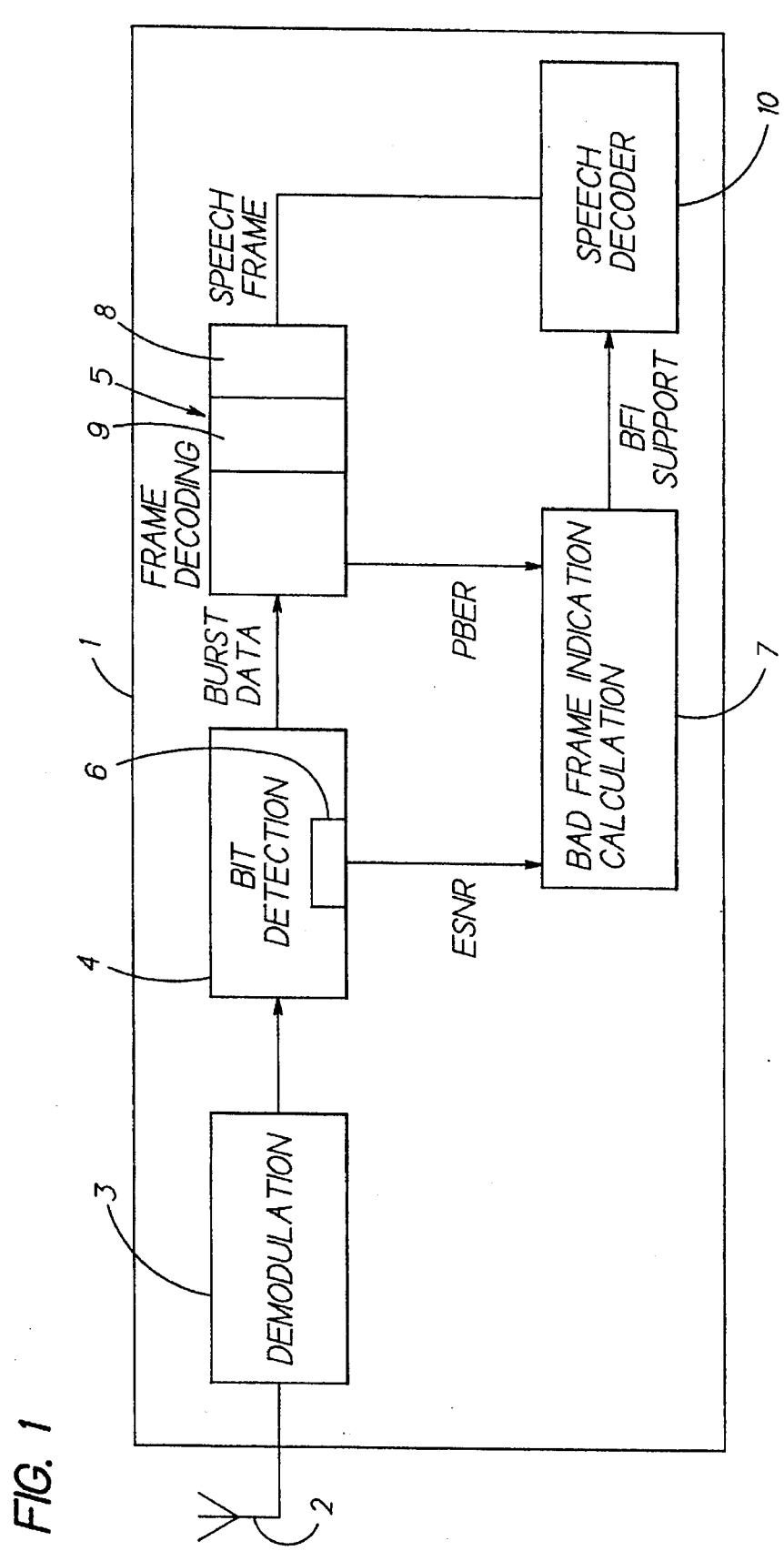
Figure 2:
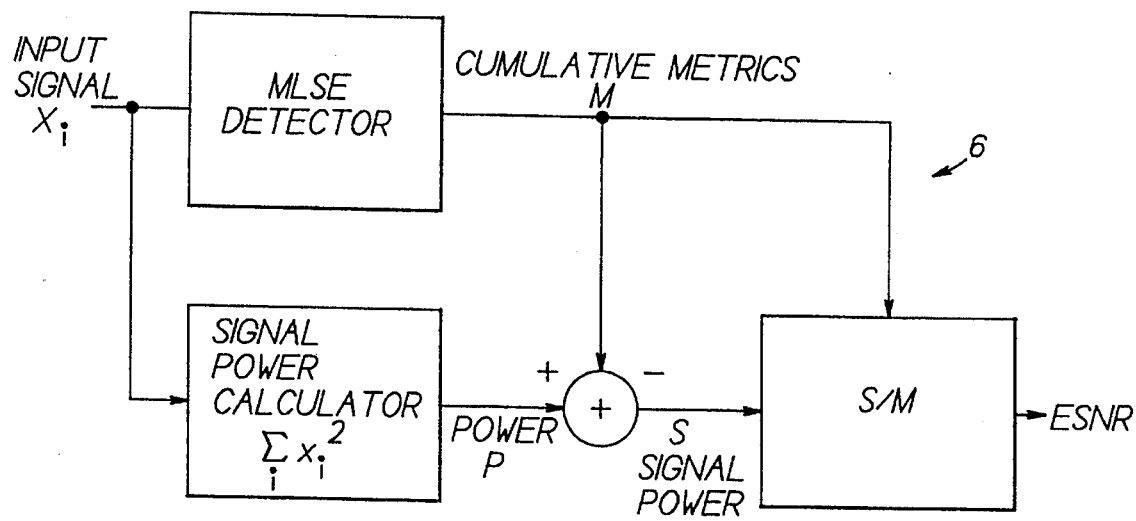
FIG. 2 is a block diagram of an ESNR circuit and FIG. 3 is a block diagram of a PBER circuit.

FIG. 1 illustrates a speech demodulator for a radio telephone 1 operating under the GSM protocol. The signal is channelled through an antenna 2 to a demodulator 3. The demodulator comprises the radio frequency elements and an A/D converter for the baseband or intermediate frequency signal output from the demodulator. The digital signal output from the demodulator is provided to the bit detector 4. The bit detector 4 comprises an equalizer and detects the burst data which is interleaved and stored for use by the frame decoder 5. The bit detector 4 also includes a signal-to-noise ratio estimator 6 (shown in FIG. 2) which estimates the signal to noise ratio (ESNR) of each burst and provides this information to a 'Bad Frame Indication calculation' module 7.

The receiver uses a Maximum Likelihood Detector (MLSE). In the block 6 shown in FIG. 2 the SNR is calculated from the cumulative metric of the maximum likelihood path and the total input signal power. A suitable MLSE detector is described in more detail in Digital Communications (Second Edition) by John G. Proakis (McGraw Hill) incorporated herein by reference. The total signal power is equal to S (signal power)+N and the cumulative metric (assuming the direct form of implementation according to Proakis, formula 6.3.5) is equal to the noise power N. The signal to noise ratio can then be calculated as (total power–noise)/noise power. Other means for providing an estimated signal-to-noise ratio could, however, be used.

Figure 3:
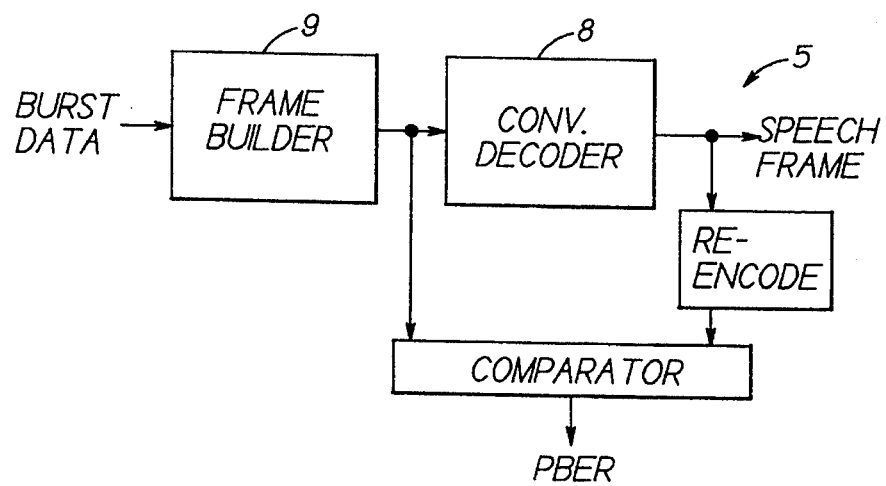

The burst data is supplied to the frame decoder 5 (shown in FIG. 3) which includes a convolutional decoder 8 and frame builder 9 for providing speech frames to a speech decoder 10. The frame decoder 5 also calculates the estimate for the bit error rate (BER), also called the pseudo-BER (PBER) and supplies this information to the 'Bad Frame Indication calculation' 7. The PBER is determined in this instance by re-encoding the channel decoder output and comparing it to the original channel decoder input data. This gives the exact error rate if the error correction is perfect but is almost correct even when averaged over a number of bits. Other ways of estimating the PBER are, however, possible.

The 'Bad Frame Indication calculation' module contains the means for determining whether a specific speech frame should be ignored based on the ESNR and the PBER supplied from the bit detector and the frame decoder respectively. A signal BFI support is generated that indicates whether a particular speech frame should be ignored. This is sent to the speech decoder 10 which does not decode those frames that are to be ignored.

The speech decoder decodes the speech frames given by the frame decoder. The decoder checks the parity of the speech frame and the BFI support to determine whether a speech frame is usable. A manner in which this determination can be made is described in detail in the GSM recommendation in series 06 incorporated herein by reference.

The speech frame is removed if $$f(ESNR, PBER)>T,$$

where f is a function of variables ESNR and PBER and T is a suitable threshold value.

In an exemplifying solution according to the invention the function f is chosen as follows:

$$f(a,b)=(D1*a)+(D2*b)$$

Thus the speech frame is removed in the exemplifying solution, if $$(D1*ESNR)+(D2*PBER)>T$$

where D1 and D2 are constants and the function is a linear combination of variables ESNR and PBER.

The function is a linear combination of the quality measures which are the estimated number of bit errors in the speech data frame and the signal to noise (interference) ratio measured for each (8) burst over which the speech data is interleaved.

Another quality measure can be derived from the signal to noise ratio figures (SNR) i.e. the variance of the SNR values of the bursts over the interleaving depth. This measure may be used in combination with the pseudo bit error rate measurement (pseudo BER).

A digital signal processor may be used to evaluate the function. The function could, however, be implemented in the form of a table, whereby the ESNR and PBER are indexes of the table and the values of the function are indexed variables of the table. The invention can be implemented using a digital signal processor, an integrated circuit, or an integrated microprocessor.

It is desirable for the number of false decisions to remove a speech frame to be minimized so that a large number of speech frames are not removed unnecessarily deteriorating the perceived speech quality.

The function f and threshold T can be fixed. However, a more flexible decoder is provided by allowing the system to be adaptive. That is, in different regimes, different functions and/or thresholds can be used. For example, when bit errors occur in very short bursts and the signal quality is otherwise fairly good the perceived quality of speech is improved by removing a large number of faulty speech frames. The threshold T may, therefore, be lowered if it is observed that the bit errors are tending to occur in very short bursts in a signal of overall relatively high quality. Under different conditions lowering the threshold could merely increase the number of frames removed without significantly improving the perceived speech quality.

In an exemplary adaptive solution a threshold value calculated from a signal responsive to the ESNR is used to provide a threshold BFI_LIM with which the PBER is compared, The threshold value BFI_LIM is calculated using the formula:

$$BFI\_LIM=(SNR\_VAR-C1)*C2+C3$$

where SNR_VAR is a variance of the values of the ESNR vectors. The BFI_ LIM value is basically a constant (C3) tuned according to the above mentioned SNR variance. The variance of the values of the ESNR vectors is determined on a burst by burst basis with each vector having eight elements so that the limiting value with which the PBER is compared adapts to the specific environment encountered.

The BFI_ LIM value can then be limited to some fixed range using constants C4 and C5. The threshold BFI_LIM obtained is kept within a range of values that correspond to upper and lower permissable limits. If the threshold is too high it is likely that frames that should be removed are not, and if it is too low, frames are not removed that should have been. The range of values for BFI_ LIM is determined in the following way:

$$C4 \leq BFI\_LIM \leq C5$$

The speech frame is removed in the adaptive exemplifying solution, if $$PBER>BFI\_LIM$$

C1, C2, C3, C4 and C5 are constants which are preferably determined by performing simulations.

The BFI_ LIM parameter is used as a threshold value against which the PBER measurement is compared when a frame erasure decision is made. A speech frame is erased if PBER exceeds the calculated threshold value BFI_ LIM.

Constants C1 to C5 are selected to achieve the best speech quality possible. There are several optimisation methods that can be used. One possible way of optimising both the fixed function and the adaptive function mentioned earlier is to run simulations that include the model of the whole receiver chain and cover several different propagation conditions and signal-to-interference ratios. The parameter values can then be changed so that optimum speech quality is achieved. It is possible to use objective listening tests and/or objective frame error rate measurements. A simulated model is preferable because the tests can be accurately reproduced but "real life" tests can also be used while the speech quality is measured. The objective measurement should give the minimum number of erased frames versus the number of frames not erased but having bit errors. That is the smallest number of frames should be erased while still minimizing the number of frames containing errors.

The constants used above are selected so that speech quality is optimized. Generally the BFI process should erase all speech frames whose most important bits are likely to be erroneous. On the other hand as few speech frames, as possible should be erased because erasures result in lost speech information. Thus the best compromise between speech frames containing errors that produce audible noise and erased speech frames resulting in lost speech, should be obtained.

A first step to achieve the BFI requirement is to use the PBER measurement to erase all speech frames that have too many errors (estimated with the PBER measurement) i.e. erasing frames whose pseudo BER exceeds the given threshold value. This basic procedure has the drawback that the number of errors, measured using the pseudo BER measurement, does not accurately reflect the number of errors in the bits used by the speech decoder. This is because pseudo BER estimate the number of its errors in the input of the channel codec, and the number of errors at the channel codec output (i.e. the speech decoder input) varies significantly according to signal conditions if, for example, the propagation conditions are static, the channel codec accepts significantly less errors in the input compared to a fading channel. It is possible to take into account this behaviour in the BFI calculation by adaptively changing the PBER threshold value (BFI_ LIM) according to the channel conditions.

This is preferably done by measuring the SNR_ VAR which indicates whether the transmission channel is static or fading at some speed. The PBER limit is determined by modifying the measured SNR_ VAR with the parameters C1 and C2 in the manner described ie (SNR_ VAR–C1)*C2. Here the C1 parameter corresponds the SNR_ VAR limit that represents a threshold value between static and dynamic channel conditions and the C2 affects the sensitivity of the BFI_ LIM value change versus the channel fading strength.

The adaptive part can be designed using measured behaviour of the SNR_ VAR parameter in different channel conditions. The following table is an example that has been derived using a simulation model. The SNR_ VAR value has been measured in different signal to interference ratios and different propagation conditions (the examples of propagation conditions are those that are defined in the GSM specifications).

| channel profile | Eb/No or C/I (signal to interference ratio) | | | |
|---|---|---|---|---|
| | 0 dB | 6 dB | 10 dB | 20 dB |
| STATIC | 2.20 | 0.13 | 0.11 | 0.11 |
| TU3 C/I | 0.34 | 0.24 | 0.21 | 0.16 |
| TU50 | 0.74 | 0.76 | 0.72 | 0.54 |
| TU50 C/I | 1.61 | 1.6 | 1.45 | 0.77 |
| HT100 | 0.79 | 0.77 | 0.77 | 1.02 |
| RA250 | 0.84 | 0.84 | 0.84 | 0.6 |
| RA250 C/I | 1.99 | 1.9 | 1.69 | 0.81 |

The figures show that the SNR_ VAR is low in the static and slowly fading cases and high in the fast fading cases. This enhanced pseudo BER based bad frame indication method can be combined with the signal to noise ratio measurement as described earlier in the invention report to further increase the BFI performance. Again the same arguments for parameter value optimisation can be used as described above.

As a specific example in GSM, a speech frame has 378 bits at the output of the convolutional decoder in the frame decoder which is the reference point for the BFI operation. The adaptive PBER measurement (ie BFI_ LIM) is typically limited to the range 50 to 65 errors in one speech frame ie C4=50, C5=65. By way of example, C1 is typically 0.3 and C2, 20 and C3, 50.

Similar optimisation methods can be used for any formula that combines the quality measures.

The method according to the invention is considerably more reliable than previously known methods. The quality of speech can be significantly improved using the method and apparatus according to the invention.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention. In particular the invention could be adapted for use with protocols other than GSM.

What is claimed is:

1. A method for identifying a bad GSM speech frame in digital mobile phone system, characterized in that the method comprises the steps of:

receiving a signal;

estimating the quality of the received signal using a function formed from an estimated signal-to-noise ratio ESNR, where the ESNR is a vector comprising the estimated signal-to-noise ratio of each received burst or a scalar describing their approximate signal-to-noise ratio, and a pseudo bit error rate PBER of a received and recorded speech frame, the ESNR and PBER being functionally related to a chosen threshold; and removing a speech frame if it fails to meet the threshold.

2. A method according to claim 1, wherein the step of removing a speech frame if f(ESNR, PBER)>T, where f is a function of variables ESNR and PBER, and where T is a chosen threshold value.

3. A method according to claim 1, wherein the function is so formed that a number of faulty decisions to remove speech frames can be minimized.

4. A method according to claim 1, wherein the function is implemented in the form of a table so that the ESNR and PBMR are indexed variables of the table.

5. A method for identifying a bad GSM speech frame in digital mobile phone system, characterized in that the method comprises the steps of:

receiving a signal;

estimating the quality of the received signal using an estimated signal-to-noise ratio ESNR, where the ESNR is a vector comprising the estimated signal-to-noise ratio of each receiveg burst or a scalar describing their approximate signal-to-noise ratio, and a pseudo bit error rate PBER of a received and recorded speech frame, the ESNR and PBER being functionally related to a chosen threshold; and removing a speech frame if it fails to meet the threshold, and wherein $$f(a,b)=(C1*a)+(C2*b)$$

is chosen for a function so that the speech frame is removed if $$(C1*ESNR)+(C2*PBER)>T$$

wherein C1 and C2 are constants and the function is a linear combination of variables ESNR and PBER.

6. A method for identifying a bad GSM speech frame in digital mobile phone system, characterized in that the method is comprised of the steps of:

receiving a signal;

estimating the quality of the received signal using an estimated signal-to-noise ratio ESNR, where the ESNR is a vector comprising the estimated signal-to-noise ratio of each received burst or a scalar describing their approximate signal-to-noise ratio, and a pseudo bit error rate PBER of a received and recorded speech frame, the ESNR and PBER being functionally related by a function f to a chosen threshold; and removing a speech frame if it fails to meet the threshold, and wherein the function f and a threshold limit T are made adaptive.

7. A method for identifying a bad GSM speech frame in digital mobile phone system, characterized in that the method is comprised of the steps of:

receiving a signal;

estimating the quality of the received signal using an estimated signal-to-noise ratio ESNR, where the ESNR is a vector comprising the estimated signal-to-noise ratio of each received burst or a scalar describing their approximate signal-to-noise ratio, and a pseudo bit error rate PBER of a received and recorded speech frame, the ESNR and PBER being functionally related to a chosen threshold; and removing a speech frame if it fails to meet the threshold, wherein the speech frame is removed if $$f(ESNR, PBER)>T$$

where f is a function of variables ESNR and PBER and T is a chosen threshold value, and wherein the threshold value is calculated $$BFI\_LIM=(SNR\_VAR)-C1)*C2+C3$$

wherein SNR_VAR is a variance of the values of the ESNR-vectors; and where the obtained result BFI_LIM is limited in the following way $$C4 \leq BFI\_LIM \leq C5$$

so that the speech frame is removed if $$PBER>BFI\_LIM,$$

where C1, C2, C3, C4 and C5 are constants defined by simulation.

8. A circuit for a radio telephone for providing speech frames from a modulated RF signal transmitted to the radio telephone as a plurality of digitally encoded bursts, comprising:

an antenna for receiving said modulated RF signal;

a demodulator for demodulating said received RF signal so as to extract digital information representing speech frames from said modulated RF signal;

signal quality determination means having an input coupled to an output of said demodulator for providing, for each received burst, a first burst quality measure and a second burst quality measure, said first burst quality measure being indicative of a signal-to-noise ratio and said second burst quality measure being indicative of a bit error rate; and means, having inputs coupled to outputs of said signal quality determining means, and responsive to a function formed in accordance with a combination of said first and second burst quality measures, for rejecting the digital information of a burst having a function that fails to meet a burst quality threshold value.

9. A circuit for a radio telephone for providing speech frames from a modulated RF signal transmitted to the radio telephone as a plurality of digitally encoded bursts, comprising:

an antenna for receiving said modulated RF signal;

a demodulator for demodulating said received RF signal so as to extract digital information representing speech frames from said modulated RF signal;

signal quality determination means having an input coupled to an output of said demodulator for providing, for each received burst, a first burst quality measure and a second burst quality measure, said first burst quality measure being indicative of a signal-to-noise ratio and said second burst quality measure being indicative of a bit error rate; and means, having inputs coupled to outputs of said signal quality determining means, and responsive to a comparison of said second burst quality measure with a burst quality threshold value, for rejecting the digital information of a burst having a second burst quality measure that fails to meet the burst quality threshold value; wherein said burst quality threshold value is derived at least in part from said first burst quality measure.

* * * * *

UNITED STATES PATENT AND TRADEMARK OFFICE
CERTIFICATE OF CORRECTION

PATENT NO. : 5,557,639

DATED : September 17, 1996

INVENTOR(S) : Heikkila et al.

It is certified that error appears in the above-identified patent and that said Letters Patent is hereby corrected as shown below:

In claim 1, column 6, line 55, "recorded" should be replaced with --recoded--.

In claim 1, col. 6, line 57, "it" should be replaced with --said speech frame--

In claim 2, column 6, line 59, "removing a" should be replaced with --said--.

In claim 4, column 6, line 67, "PBMR" should be replaced with --PBER--.

In claim 5, column 7, line 8, "receiveg" should be replaced with --received--.

In claim 5, column 7, line 10, "recorded" should be replaced with --recoded--.

In claim 5, column 7, line 13, "it" should be replaced with --said speech frame--.

In claim 5, column 7, lines 16, 19 and 21 "C" (both occurrences) should be replaced with --D--.

In claim 5, column 7, line 24, "ESNR and" should be replaced with --where A=ESNR and B=--.

In claim 6, column 7, line 34, "recorded" should be replaced with --recoded--.

In claim 6, column 7, line 37, "it" should be replaced with --said speech frame--.

In claim 7, column 7, line 49, "recorded" should be replaced with --recoded--.

In claim 7, column 7, line 52, "it" should be replaced with --said speech frame--.

In claim 7, column 7, line 61, "BFI_LIM" should be replaced with --T--.

UNITED STATES PATENT AND TRADEMARK OFFICE
CERTIFICATE OF CORRECTION

PATENT NO. : 5,557,639
DATED : September 17, 1996
INVENTOR(S) : Heikkila et al.

It is certified that error appears in the above-identified patent and that said Letters Patent is hereby corrected as shown below:

In claim 7, column 8, line 2, "BFI_LIM" should be replaced with - -T- -.

In claim 7, column 8, line 5, "BFI_LIM" should be replaced with - -T- -.

In claim 7, column 8, line 10, "BFI_LIM" should be replaced with - -T- -.

In claim 8, column 8, line 27, after "a" insert - -pseudo- -.

In claim 9, column 8, line 49, after "a" insert - -pseudo- -.

In claim 9, column 8, line 55, "a" should be replaced with - -the- -.

Signed and Sealed this

Twenty-fifth Day of March, 1997

Attest:

BRUCE LEHMAN

*Attesting Officer*   *Commissioner of Patents and Trademarks*